United States Patent Office 2,884,369
Patented Apr. 28, 1959

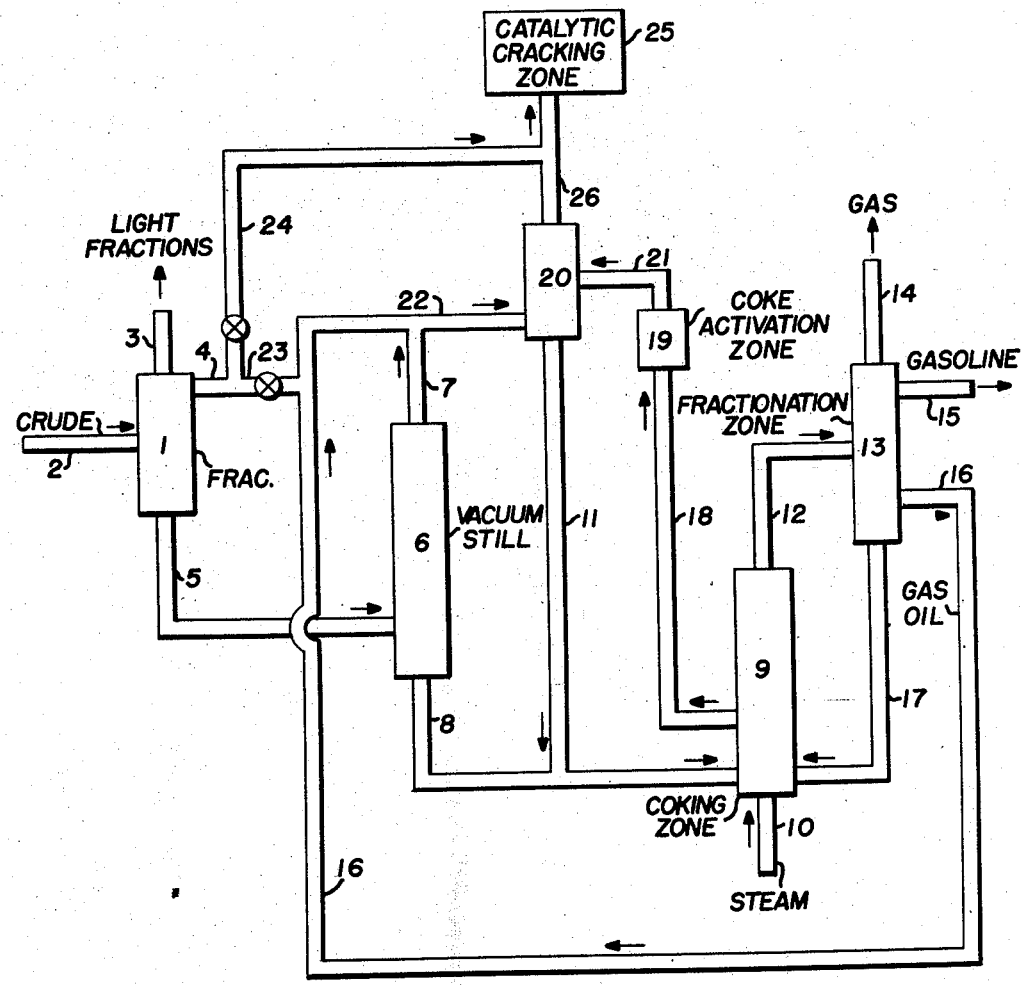

2,884,369

REMOVAL OF METAL CONTAMINANTS FROM A HYDROCARBON FEED

William Judson Mattox and Charles Newton Kimberlin, Jr., Baton Rouge, La., assignors to Esso Research and Engineering Company, a corporation of Delaware Application March 1, 1955, Serial No. 491,274

5 Claims. (Cl. 208—91)

This invention concerns a technique for improving the catalytic cracking of heavy gas oil feed stocks which normally contain metal contaminants detrimental to the catalytic cracking process. The invention particularly concerns a process for removing such metal contaminants from catalytic cracking feed stocks by contact with and treatment by activated carbon having a surface area greater than about 500 square meters per gram. In a specific and prefered embodiment of the invention, the processes of catalytic cracking, treatment with activated carbon, and coking are combined to provide an integrated process. In this embodiment of the invention, coke derived from the coking operation is activated to provide the activated carbon required in the treating process. Both virgin gas oil and gas oil derived from the coking operation are subjected to treatment with the activated carbon and the treated gas oils are then catalytically cracked.

One of the principal refining operations in commercial use at this time involves the catalytic cracking of so-called gas oil fractions derived from a petroleum oil. Recently, economic requirements have dictated the necessity of employing higher gas oils as catalytic cracking feed stocks. In particular, it has been found desirable in balanced refinery operations to catalytically crack gas oils containing constituents having an equivalent atmospheric boiling point above about 900° or 950° F., ranging upwardly to about 1050° F. to 1300° F. Such heavy, high-boiling gas oils have been found to contain nickel, vanadium, and iron contaminants which, if introduced into a catalytic cracking reactor, serve to seriously degrade the catalyst. Such metal contaminants apparently occur in heavy gas oils as metal pophyrins which cannot be separated from gas oil by distillation processes. High-boiling gas oils of the character identified, whether derived from a crude oil by distillation or derived from other refining operations such as coking, are characterized by inclusion of these metal contaminants. In general, the heavy gas oils referred to will contain about 10–20 pounds of metal contaminants per 1000 barrels, ranging upwardly to as much as 50 pounds per 1000 barrels.

A great deal of effort is being applied at this time to the development of techniques for removing such metal contaminants from catalytic cracking feed stocks. The present invention is directed to a novel technique for accomplishing this objective by selectively removing the metal contaminants by means of an adsorbent.

The present invention is based on exploratory research work in which attempts were made to remove metal contaminants from heavy gas oils employing a wide variety of solid adsorbents. In the course of this work, it was determined that activated carbon appears to be particularly and uniquely qualified for the selective adsorption of metal contaminants. In particular it has been found that activated carbon is effective for this purpose while other adsorbents such as silica gel, alumina and the like are relatively ineffective. It has also been determined that in order to permit selective and substantial adsorption of metal contaminants with activated carbon, it is essential to employ an activated carbon of high surface area. In this connection it has been found critical to employ activated carbons having a surface area greater than about 500 square meters per gram. Activated carbons having surface areas greater than 800 square meters per gram are preferred.

In order to conduct the process of this invention, the heavy gas oil containing metal contaminants is contacted with the activated carbon at a temperature of about 300° to 750° F. This temperature is critically chosen to achieve selective removal of metal contaminants while avoiding cracking of the heavy gas oil. At temperatures above the range stated, cracking is encountered, resulting in rapid deactivation of the activated carbon and preventing effective remvoal of metal contaminants. In view of this factor, it is essential to carry out the adsorbent treatment in a manner preventing thermal or catalytic cracking of the heavy gas oil being treated. Removal of metal contaminants is promoted by use of elevated temperatures so that a temperature in the range of about 500° to 700° F. is particualry adapted for the purposes of this invention. Most specifically, it is preferred to employ a temperature of about 700° F.

The pressure maintained during adsorbent treatment is not critical so that any desired pressure may be employed. However, it is a particular feature of this invention that the treatment can be conducted at atmospheric pressure.

The activated carbon is employed in treats of about 5 to 20 weight percent based on the gas oil to be treated. It is apparent that the particular amount of activated carbon to be used will be dependent upon the metal contaminant content of the heavy gas oil to be treated and will be dependent on the ultimate level of metal contaminants desired. In general, however, it is preferred to treat the oil with about 10 to 15 weight percent of activated carbon.

In a specific embodiment of the invention, use is made of the coke obtained by coking of heavy residual oils. Such coke can be activated for the purposes of this invention by conventional activation treatments. Such activation treatments include steaming, partial oxidation, etc. For example, oxidation of a coke (obtained by coking a typical heavy residuum) with air in a fluid bed at temperatures of 600° to 1000° F., preferably 650° to 750° F., to a yield of 50% to 97%, preferably 80% to 90%, provided activated cokes suitable for use in this process.

Use of activated carbon derived from a coking process in this manner is particularly advantageous in permitting an integration of the processes of coking and catalytic cracking. As a feature of this integrated process, heavy gas oil derived from the coking process, and normally containing metal contaminants, is also treated by the activated carbon treatment of this invention. Such treated coker gas oils, along with treated heavy virgin gas oils, can then be subjected to catalytic cracking.

In order to fully indicate the nature of this invention, reference will be made to the attached drawing which diagrammatically illustrates a preferred embodiment of the invention constituting a combination process for fractionation of crude oil, coking of residual crude oil fractions, removal of metal contaminants from heavy gas oil fractions of the crude oil and from coker gas oils, and catalytic cracking of the treated gas oils.

As illustrated in the drawing described above, a crude petroleum oil may be brought into an atmosphere fractionation system 1 through line 2. Fractionation system 1 will be operated to permit removal of light oil fractions overhead through line 3 and of a light gas oil as a side streams product through line 4. The gas oil of line 4 will boil within the range of about 400° to 900° F., and will be substantially devoid of metal contaminants. A residual oil fraction will be removed from fractionation system 1 through bottoms withdrawal 5 constituting the portion of the crude oil boiling above about 900° F.

The residual oil of line 5 is then subjected to vacuum distillation in zone 6. Vacuum still 6 will be operated to permit removal of an overhead product through line 7 constituting a heavy gas oil. This gas oil will be particularly characterized by inclusion of constituents having a normal atmospheric boiling point above about 950° F. and including metal contaminants of the character referred to hereinbefore. The heavy gas oil will have a boiling range within the temperatures of about 900° to 1300° F. Finally, a heavy residual oil boiling above this range will be removed from vacuum still 6 through line 8.

In accordance with this preferred embodiment of the invention, the residual oil of line 8 is subjected to a coking process. Any desired process may be used for this coking in which the residual oil is heated at temperatures of about 900° to 1100° F., in contact with coke. In this process, residual oil undergoes cracking, vaporization, and coking. It is particularly preferred to employ a fluidized coking process in the practice of this invention. Such a process may be carried out in fluid coking zone 9 illustrated in the drawing. The requisite steam for maintenance of fluidized conditions in zone 9 will be brought into the zone through line 10 together with coke derived from line 11 in the manner to be described hereinafter.

The fluid coking unit consists basically of a reaction vessel or coker and a heater or burner vessel. In a typical operation, the heavy oil to be processed is injected into the reaction vessel containing a dense turbulent fluidized bed of hot inert solid particles, preferably coke particles. A transfer line or staged reactors can be employed. Uniform temperature exists in the coking bed. Uniform mixing in the bed results in virtually isothermal conditions and effects instantaneous distribution of the feed stock. In the reaction zone, the feed stock is partially vaporized and partially cracked. Product vapors are removed from the coking vessel and sent to a fractionator for the recovery of gas and light distillates. A gas oil fraction is also segregated for subsequent catalytic cracking. Any heavy bottoms is usually returned to the coking vessel. The coke produced in the process remains in the bed coated on the solid particles. Stripping steam is injected into a stripping zone to remove oil from the coke particles prior to the passage of the coke to the burner.

The heat for carrying out the endothermic coking reaction is generated in the burner vessel, usually but not necessarily separate from the reactor. A stream of coke is thus transferred from the reactor to the burner vessel, such as a transfer line or fluid bed burner, employing a standpipe and riser system; air being supplied to the riser for conveying the solids to the burner. Sufficient coke or added carbonaceous matter is burned in the burning vessel to bring the solids therein up to a temperature sufficient to maintain the system in heat balance. The burner solids are maintained at a higher temperature than the solids in the reactor. About 5% of coke, based on the feed, is conventionally burned for this purpose. This may amount to approximately 15% to 30% of the coke made in the process. The net coke production, which represents the coke produced less the coke burned, is withdrawn.

The products of the coking process are withdrawn from zone 9 through line 12 to be subjected to fractionation in zone 13. The fractionation operation will be conducted to permit removal of light gaseous products through line 14 and light liquid products, such as gasoline, through side stream withdrawal 15. A gas oil, particularly constituting a heavy boiling gas oil, will be withdrawn as a side stream product through line 16.

This gas oil will contain constituents boiling above about 900° F. and will generally boil within the range of about 400° to 1050° F., or higher, up to about 1300° F. For this purpose, it will be understood that fractionation zone 13 may constitute a vacuum distillation system permitting the segregation of such heavy boiling gas oil without cracking. Finally, heavy residual oil, higher boiling than the gas oil, will be withdrawn as a bottoms product from the fractionation system for recycle to the fluid coking zone through line 17 as described above.

Coke may be withdrawn from coking zone 9 through line 18 in the quantities required for the treating process to be described. Preferably, this coke withdrawal is conducted from the coke burner of the fluid coking operation normally constituting the product coke. The coke is passed to an activation zone 19 wherein the coke is treated under the conditions identified hereinbefore in order to activate the coke so as to have a surface area greater than about 500 square meters per gram. For this purpose, the coke may be maintained as a fluid bed of coke, employing air to fluidize the coke. Temperature in the activation zone will be maintained within the range of about 600° to 1000° F., and preferably about 650° to 750° F. By maintaining the coke under these conditions until a yield of activated carbon in amounts of about 50% to 97%, preferably 80% to 90%, is obtained an activated carbon having a surface area greater than about 500 square meters per gram can be obtained. This activated coke is then introduced to treating zone 20 by transfer through line 21. Treating zone 20 will constitute a batch or continuous treating vessel wherein heavy gas oil is contacted with the activated coke at temperatures in the range of 300° to 750° F., for time of about 15 minutes to 2 hours.

The gas oil to be treated with the activated carbon in zone 20 will particularly constitute the heavy gas oil of line 7 derived from vacuum still 6. In addition, the heavy gas oil of line 16 derived from the coking process will be combined with the gas oil of line 7 in line 22. Optionally, some of the light gas oil of line 4 derived from the atmospheric fractionator may also be subjected to treatment in zone 20 by passage through valved line 23. Use of minor portions of this gas oil in zone 20 in amounts of about 5 to 20% may preferably be employed to reduce the viscosity of the heavy gas oil to facilitate contacting and treatment of the heavy gas oil in zone 20. The major portion of the light gas oil of line 4 is passed directly to a catalytic cracking zone 25 through line 24, however.

As described then, the heavy gas oil of lines 7 and 16 is brought into zone 20 for treatment with activated carbon. The treated gas oil is then conducted to the catalytic cracking zone 25 through line 26. Any desired type of catalytic cracking may be carried out in zone 25, although preferably the cracking operation will constitute a fluidized cracking process.

The fluidized solids technique for cracking hydrocarbons comprises a reaction zone and a regeneration zone, employed in conjunction with a fractionation zone. The reactor and the catalyst regenerator are or may be arranged at approximately an even level. The operation of the reaction zone and the regeneration zone is preferably as follows:

An overflow is provided in the regeneration zone at the desired catalyst level. The catalyst overflows into a withdrawal line which preferably has the form of a U-shaped seal leg connecting the regeneration zone with the reaction zone. The feed stream introduced is usually preheated to a temperature in the range from about 500° to 650° F., by heat exchange with regenerator flue gases which are removed overhead from the regeneration zone, or with cracked products. The heated feed stream is then introduced into the reactor. The seal leg is usually sufficiently below the point of feed oil injection to prevent oil vapors from backing into the regenerator in case of normal surges.

Since there is no restriction in the overflow line from the regenerator, satisfactory catalyst flow will occur as long as the catalyst level in the reactor is slightly below the catalyst level in the regenerator when the vessels are maintained at about the same pressure. Spent catalyst from the reactor flows through a second U-shaped seal leg from the bottom of the reactor into the bottom of the regenerator. The rate of catalyst flow is controlled by injecting some of the air into the catalyst transfer line to the regenerator.

The pressure in the regenerator may be controlled at the desired level by a throttle valve in the overhead line from the regenerator. Thus, the pressure in the regenerator may be controlled at any desired level by a throttle valve which may be operated, if desired, by a differential pressure controller. If the pressure differential between the two vessels is maintained at a minimum, the seal legs will prevent gases from passing from one vessel into the other in the event that the catalyst flow in the legs should cease.

The reactor and the regenerator may be designed for high velocity operation involving linear superficial gas velocities of from about 2.5 to 4 feet per second. However, the superficial velocity of the upflowing gases may vary from about 1 to 5 feet per second and higher. Catalyst losses are minimized and substantially prevented in the reactor by the use of multiple stages of cyclone separators. The regeneration zone is also provided with cyclone separators. These cyclone separators usually include 2 to 3 or more stages.

Distributing grids may be employed in the reaction and regeneration zones. Operating temperatures and pressures may vary appreciably depending upon the feed stocks being processed and upon the products desired. Operating temperatures are, for example, in the range from about 800° to 1000° F., preferably about 850° to 950° F. in the reaction zone. Elevated pressures may be employed, but in general, pressures below 100 pounds per square inch gauge are utilized. Pressures generally in the range from 1 to 30 pounds per square inch gauge are preferred. Catalyst to oil ratios of about 3 to 10, preferably about 6 to 8 by weight, are used.

The catalytic material used in the fluidized catalyst cracking operation are conventional cracking catalysts. These catalysts are oxides of metals of groups II, III, IV and V of the periodic table.

A preferred catalyst comprises silica-alumina wherein the weight percent of the alumina is in the range from about 5 to 20%. Another preferred catalyst comprises silica-magnesia where the weight percent of the magnesia is about 20 to 35%.

The size of the catalyst particles is usually below about 200 microns. Usually at least 50% of the catalyst has a micron size in the range from about 20 to 80. Under these conditions with the superficial velocities as given, a fluidized bed is maintained where, in the lower section of the reactor, a dense catalyst phase exists while in the upper area of the reactor a disperse phase exists.

Included in the catalytic cracking system is a product fractionator adapted to segregate gasoline and heavier boiling fractions of the cracked product.

In order to show the particular advantages and utility of this invention, representative data is referred to hereinafter. Reference will first be made to a series of tests in which solid adsorbent treatments of a heavy gas oil having a mid-boiling point of 950° F., were carried out. This gas oil contained 2.3 p.p.m. of nickel and 0.2 p.p.m. of vanadium. The gas oil was treated with a variety of solid adsorbents employing different amounts of these adsorbents and for different temperatures and for different periods of time. Typical data indicating the results obtained are summarized in Table I. In this table the treat with the different absorbents is indicated in weight percent. The approximate surface area of each adsorbent is shown in the table in the unit of square meters per gram. The temperature of each particular treatment is given in degrees F.

*Table I*

| Treat No. | | Surface Area | Temp. | Time, Hrs. | Treated Oil | |
|---|---|---|---|---|---|---|
| | | | | | Recov., Percent | Ni, p.p.m. |
| A | 5% Activated Carbon | 1,200 | 500 | 1 | 94 | 1.2 |
| B | 10% Activated Carbon | 1,200 | 500 | ½ | 90 | 0.60 |
| C | 15% Activated Carbon | 1,200 | 500 | ½ | 89 | 0.48 |
| D | 10% Activated Carbon | 1,200 | 750 | ½ | 87 | 0.38 |
| E | ___do___ | 500 | 750 | ½ | 93 | 1.1 |
| F | 10% Silica Gel | 600 | 750 | ½ | 88 | 1.8 |
| G | 10% Activated Carbon | 150 | 750 | ½ | 95 | 1.7 |
| H | ___do___ | 150 | 725 | ½ | 94 | 1.8 |
| I | 10% (40% Al$_2$O$_3$, 60% SiO$_2$) | 350 | 500 | ½ | 95 | 2.0 |
| J | 10% (20% B$_2$O$_3$, 40% Al$_2$O$_3$, 40% SiO$_2$) | 350 | 500 | ½ | 94 | 1.9 |

Considering the data of Table I, it will be observed that in no case was substantial metals removal possible employing any adsorbent other than activated carbon. The data also show that the surface area of the adsorbent is a critical requirement of the process, establishing that as the surface area of an adsorbent falls below about 500 square meters per gram, it becomes much less effective for metals removal. While this factor of surface area in part accounts for the unsatisfactory performance of all of the adsorbents tested, analysis of these data shows that above and beyond this factor, adsorbents other than activated carbon were unsatisfactory. The data, therefore, show the particular utility of employing activated carbon having a surface area of about 800 to 1000 or above for the removal of metal contaminants. These data show that it is possible to remove metal contaminants from a heavy gas oil so as to provide a treated gas oil having a nickel content as low as about 0.5 part per million of nickel at yields of about 90% or better by an activated carbon treatment of about 7 weight percent at 750° F. or about 10 weight percent at 500° F.

What is claimed is:

1. A combination refining process in which a crude petroleum oil is fractionated to provide a heavy gas oil fraction including constituents boiling above about 900° F., and a residual oil fraction, said residual oil fraction being subjected to a coking operation producing coke and a second heavy gas oil boiling above about 900° F., activating said coke to produce an activated carbon having a surface area greater than about 500 square meters per gram, removing iron, nickel and vanadium porphyrins from said first and second heavy gas oils by contacting said oils with said activated carbon at a temperature in the range of about 300° to 750° F., and thereafter subjecting said treated gas oil to catalytic cracking.

2. A process for removing iron, nickel and vanadium porphyrins from a petroleum fraction including constituents boiling in excess of about 900° F. which comprises contacting said fraction at a temperature between about 300° F. and about 750° F. with from about 5 to about 30 wt. percent, based upon the oil, of an activated carbon having a surface area in excess of about 500 square meters per gram and recovering a treated oil reduced in iron, nickel and vanadium content.

3. A process as defined by claim 2 wherein said fraction is contacted with said activated carbon at a temperature between about 500° F. and about 700° F.

4. A process as defined by claim 2 wherein said activated carbon has a surface area in excess of about 800 square meters per gram.

5. A process as defined by claim 2 wherein said treated oil is catalytically cracked.

(References on following page)

References Cited in the file of this patent

UNITED STATES PATENTS

| | | |
|---|---|---|
| 1,945,583 | Wietzel | Feb. 6, 1934 |
| 2,219,101 | Finwall | Oct. 22, 1940 |
| 2,644,785 | Harding et al. | July 7, 1953 |
| 2,655,465 | Martin | Oct. 13, 1953 |
| 2,689,825 | McKinley | Sept. 21, 1954 |
| 2,771,407 | Penick | Nov. 20, 1956 |
| 2,777,802 | Peet | Jan. 15, 1957 |
| 2,848,379 | Rehner et al. | Aug. 19, 1958 |

OTHER REFERENCES

C. L. Mantell: "Adsorption," McGraw-Hill Book Co., Inc. (1945), 1st edition, pages 142–146.

Mantell: "Industrial Carbon," page 162, second edition (1946), published by D. Van Nostrand Co., 250 Fourth Avenue, New York, N. Y.